(12) United States Patent
Komukai (10) Patent No.: US 10,373,063 B2
(45) Date of Patent: Aug. 6, 2019

(54) SEARCH SCHEDULE DETERMINING APPARATUS

(71) Applicant: MITSUBISHI HEAVY INDUSTRIES, LTD., Tokyo (JP)

(72) Inventor: Jun Komukai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 524 days.

(21) Appl. No.: 14/665,421

(22) Filed: Mar. 23, 2015

(65) Prior Publication Data

US 2015/0269492 A1    Sep. 24, 2015

(30) Foreign Application Priority Data

Mar. 24, 2014  (JP) ................................. 2014-060831

(51) Int. Cl.
*G06N 7/00* (2006.01)

(52) U.S. Cl.
CPC .................... *G06N 7/005* (2013.01)

(58) Field of Classification Search
None
See application file for complete search history.

(56) References Cited

FOREIGN PATENT DOCUMENTS

| JP | 4-204187 | 7/1992 |
|---|---|---|
| JP | 2008-100591 | 5/2008 |
| JP | 2010-132073 | 6/2010 |
| JP | 2011-229656 | 11/2011 |
| JP | 2012-159459 | 8/2012 |

OTHER PUBLICATIONS

Vidan et al., Comparative Analysis of Renowned Softwares for Search and Rescue Operations, Nov. 17, 2015, pp. 73-80.*
Transas Search and Rescue Software, 2014, Transas MIP Ltd., Product Brochure, pp. 1-4.*
SARMAP Search & Rescue Model and Response System, Applied Science Associates, http://www.asascience.com:80/software/sarmap/, online brochure obtained via Internet Archive Wayback Machine on Jul. 8, 2017, originally captured on May 9, 2009.*
Office Action dated Dec. 13, 2017 in Japanese Patent Application No. 2014-060831, with English translation.

* cited by examiner

*Primary Examiner* — Steven B Gauthier
(74) *Attorney, Agent, or Firm* — Wenderoth, Lind & Ponack, L.L.P.

(57) ABSTRACT

In a search schedule determining apparatus, a target probability distribution showing a distribution of probabilities of positions of a target in a time zone is calculated based on target previous information. A search ability showing a quantitative evaluation of an ability to discover the target is calculated based on search vehicle previous information. A search effort distribution is calculated based on the target probability distribution and the search ability such that a combination of probabilities in which each of the search vehicles discovers the target has a maximum. A search schedule is automatically determined based on the target previous information and the search vehicle previous information such that the search vehicles are operated to realize the search effort distribution.

3 Claims, 6 Drawing Sheets

| TARGET MOVING ROUTE | SEARCH VEHICLE USED | SEARCH SCHEDULE | | | | | |
|---|---|---|---|---|---|---|---|
| 110a | 31 | ├────────────→┤ | | | | | 61 |
| | 310 | | ├──────────────→┤ | | | | 62 |
| 110b | 32 | ├──────────────────────→┤ | | | | | 63 |
| | 320 | ├────────────────→┤ | | | | | 64 |
| 110c | 33 | | ├──────────→┤ | | | | 65 |
| | | t1 | t2 | t3 | t4 | t5 | |

SEARCH SCHEDULE DETERMINING APPARATUS

TECHNICAL FIELD

The present invention relates to a search schedule determining apparatus and a search schedule determining method, especially, to a search schedule determining apparatus and a search schedule determining method, by which a search schedule can be automatically determined.

BACKGROUND ART

A technique is known of searching ships which travel on very wide ocean from above by using various sensors installed in an artificial satellite or an aircraft as a search vehicle.

However, when the ground and ocean should be searched from the artificial satellite, the artificial satellite needs be arranged at so-called low orbit in hundreds kilometer from the ground in order to secure the resolution of the imaging sufficiently. In the artificial satellite which orbits the earth on such a low orbit, there is a limit in a time zone of staying above an area of a search object, unlike a case of the stationary satellite arranged at so-called geostationary orbit in about 36,000 kilometers from the ground.

Also, the regular replenishment of fuel is indispensable for the aircraft and there is a limit in the time of staying above the area of the search object. That is, the aircraft needs to repeat a routine of taking off from an airport or a base, flying to the area of the search object, carrying out a search operation, returning to the airport or the base, and then receiving various types of replenishment.

Moreover, an infrared sensor as an imaging unit used for a search vehicle cannot sometimes show the performance sufficiently in bad weather such as rain, and the imaging using a visible ray is unsuitable in night.

In addition to such a technical limitation, there is a limitation in the search vehicle usable in the actual search activity. That is, it is necessary to plan more effective search activity, in consideration of a limitation of the airport facilities near sufficiently from a predicted position of the target as the search object, a limitation of the search vehicles to be stood-by in the above airport facilities, and a limitation on the search vehicles actually usable in the range of the above limitations.

In conjunction with the above, Patent Literature 1 (JP H04-204187A) discloses an infrared-ray front monitoring apparatus. The infrared-ray front monitoring apparatus includes an infrared sensor, an image preprocessing section, a movement detecting section, a display section, a search schedule determining section, a sensor driving section and an operation section. Here, the infrared sensor images an infrared image. The image preprocessing section converts an image analog signal which is obtained from the infrared sensor into a digital signal. The movement detecting section detects a relative movement of an object in the image obtained from the image preprocessing section. The display section displays a position and a movement vector of the object obtained from the movement detecting section. The search schedule determining section generates a search pattern according to a relative movement quantity obtained from the movement detecting section. The sensor driving section turns the infrared sensor according to a visual axis drive angle which is instructed from the search schedule determining section. The operation section instructs the start-up and end of an automatic search mode.

Also, Patent Literature 2 (JP 2010-132073A) discloses a search work support system. This search work support system includes a navigation system, a radio receiver-transmitter, a database and an information processing unit. Here, in the navigation system, each of a plurality of rotorcrafts which carry out the search work measures a position and a speed of itself. The radio receiver-transmitter transmits and receives execution information of the search work by a radio signal to or from the other rotorcrafts. The database stores a search plan which contains position information of each of search areas of the rotorcrafts and the execution information of the search work of itself based on the search plan. The information processing unit plans a new search plan of itself based on the position and speed of itself measured by the navigation system, the execution information of the search work of the other rotor crafts received by the radio receiver-transmitter, and the search plan of the other rotor crafts stored in the database.

CITATION LIST

[Patent Literature 1] JP H04-204187A
[Patent Literature 2] JP 2010-132073A

SUMMARY OF THE INVENTION

A search schedule is automatically determined to operate some finite search vehicles efficiently. The other problems and new features will become clear from the description and the attached drawing of this Specification.

A search schedule determining apparatus of the present invention includes a target probability distribution calculating section, a search ability calculating section, a search effort distribution calculating section, and a search calculating section. The target probability distribution calculating section calculates a target probability distribution showing a distribution of probabilities of positions where a target is predicted to exist in a predetermined time zone, based on target previous information collected previously for the target as a search object. The search ability calculating section calculates a search ability showing a quantitative evaluation of an ability to discover the target based on search vehicle previous information collected previously for each of search vehicles. The search effort distribution calculating section calculates a search effort distribution based on the target probability distribution and the search ability such that a combination of probabilities in which each of the search vehicles discovers the target has a maximum value. The search calculating section automatically determines a search schedule based on the target previous information and the search vehicle previous information such that the search vehicles are operated to realize the search effort distribution.

A search schedule determining method of the present invention includes collecting target previous information of a target as a search object by a target distribution probability calculating section; calculating a target probability distribution showing a distribution of probabilities of positions where the target is predicted to exist in a predetermined time zone, based on the target previous information by the target distribution probability calculating section; collecting search vehicle previous information of each of search vehicles by a search ability calculating section; calculating search ability showing a quantitative evaluation of ability to discover the target based on the search vehicle previous information by a search ability calculating section; calculating a search effort distribution based on the target probability distribution and the search ability by a search effort distribution calculating section, such that a combination of the probabilities in which each of the search vehicles discovers the target is maximum; and automatically determining a search schedule based on the target previous information and the search vehicle previous information by a search schedule calculating section such that the search vehicles are operated to realize the search effort distribution.

In the present invention, a non-transitory recording medium which stores a search schedule determining program to make a computer execute the search schedule determining program to implement functions of: collecting a target previous information of a target as a search object by a target distribution probability calculating section; calculating a target probability distribution showing a distribution of probabilities of positions where the target is predicted to exist in a predetermined time zone, based on the target previous information by the target distribution probability calculating section; collecting search vehicle previous information of each of search vehicles by a search ability calculating section; calculating search ability showing a quantitative evaluation of ability to discover the target based on the search vehicle previous information by a search ability calculating section; calculating a search effort distribution based on the target distribution probability and the search ability by a search effort distribution calculating section, such that a combination of the probabilities in which each of the search vehicles discovers the target is maximum; and automatically determining a search schedule based on the target previous information and the search vehicle previous information by a search schedule calculating section such that the search vehicles are operated to realize the search effort distribution.

According to the one embodiment, the search schedule can be automatically determined to make a probability of discovering a target with some finite search vehicles have a maximum.

DESCRIPTION OF EMBODIMENTS

Hereinafter, a search schedule determining apparatus and a search schedule determining method according to embodiments of the present invention will be described below with reference to the attached drawings.

First Embodiment

Figure 1:
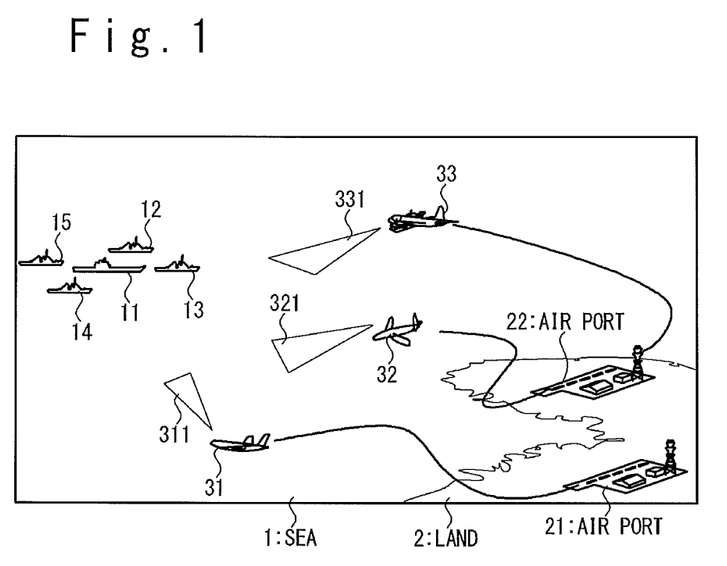
FIG. 1 is a diagram showing an example of a position relation of a target and search vehicles.

FIG. 1 is a diagram showing an example of a position relation between a search target and search vehicles. In FIG. 1, a plurality of ships 11 to 15 invade from sea 1 toward a land 2. A plurality of aircrafts 31 to 33 as the search vehicles take off from airports 21 and 22 and searches the positions of these ships 11 to 15 in search ranges 311, 321, and 331, respectively.

In a conventional technique, the operation of the search vehicles was carried out in the following presupposition. That is, it is presupposed that a pattern of action in the search by aircrafts was previously determined. Also, it presupposed that search vehicles were sufficiently prepared. Moreover, it is presupposed that the search vehicles can search in an enough long time.

However, the aircraft as the search vehicle receives a constraint of endurance and so on in actual. That is, there is a limit in a loadable fuel amount for every aircraft, and the aircraft needs to carry out a flight for a destination, a search operation, and return to the airport, within a loaded fuel amount.

Also, as long as the aircrafts as the search vehicles cannot be inexhaustibly prepared, the efficiency of the search has to be considered. That is, an existence probability of a group of the ships as the search target is predicted with respect to a position and a time. In the search operation, the position having a high probability is searched with a priority, and the number of aircrafts is decreased for the position having a low probability.

When an action pattern of the aircraft as the search vehicle is presupposed without considering the above-mentioned constraints, the effective search operation cannot be expected in actual. Therefore, in order to improve the probability of discovering the ship group as the search target, an operation method of the aircrafts as some finite search vehicles needs to be reconsidered.

Figure 2:
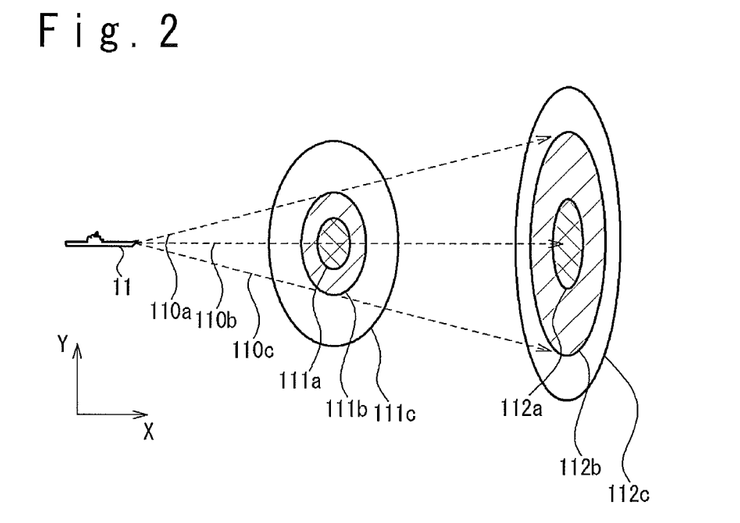
FIG. 2 is a diagram showing an example of definition of a target probability distribution.

FIG. 2 is a diagram showing an example of the definition of a probability distribution of discovering the search target. In this case, the search operation of the ship 11 as a representative of the ships 11 to 15 shown in FIG. 1 will be described, but the description is applied to the other ships 12 to 15.

In an example shown in FIG. 2, as target previous information about the ship 11 as the search target, a position of the ship 11 at a predetermined reference time, a movement speed of the ship 11, possible movement routes 110a to 110c of the ship 11, and a probability that each of the possible movement routes 110a to 110c is adopted by the ship 11 are collected and acquired previously. Note that a part of the target previous information may be estimated based on other collected information.

It is possible to calculate a distribution of of probabilities of a position where the ship 11 is predicted to exist in a time zone. In the example of FIG. 2, this probability distribution is shown by three contour lines 111a to 111c. The ship 11 exists in the inner contour line 111a in the highest probability, in the middle contour line 111b in a next higher probability, and in the outer contour line 111c in a next higher probability. Note that a probability that the ship 11 exists outside the outer contour line 111c is not zero.

Moreover, it is possible to calculate a distribution of the probabilities of positions where the ship 11 is predicted to exist in a next time zone. In an example of FIG. 2, the probability distribution is shown with three contour lines 112a to 112c. The meaning of these contour lines 112a to 112c is the same as that of the above-mentioned contour lines 111a to 111c. Of course, the distribution of calculated probabilities trends to spread on the ocean as time elapses. In more detailed, in the next time zone, the ship 11 is predicted to exist in the inner contour line 112a in the highest probability, in the middle contour line 112b in a next higher probability, and in the outer contour line 112c in a next higher probability. Note that the probability that the ship 11 exists outside the outer contour line 112c is not zero.

In the example of FIG. 2, the probability distribution is expressed with a set of the contour lines for simplification of the description. However, another method may be used. For example, the ocean may be divided into a plurality of meshes and a probability of a position where the ship 11 is predicted to exist in a predetermined time zone may be calculated for every mesh.

Also, in the example of FIG. 2, the probability distribution of the ship 11 as the representative of the ships 11 to 15 shown in FIG. 1 is calculated. However, actually, the probability distribution of each of all the ships may be calculated, and the overall probability distribution of all the ships may be calculated from the calculated probability distributions. In the present example, only the probability distribution of the ship 11 is calculated and the calculation result is used as an approximation of the overall probability distribution of all the ships 11 to 15.

Figure 3:
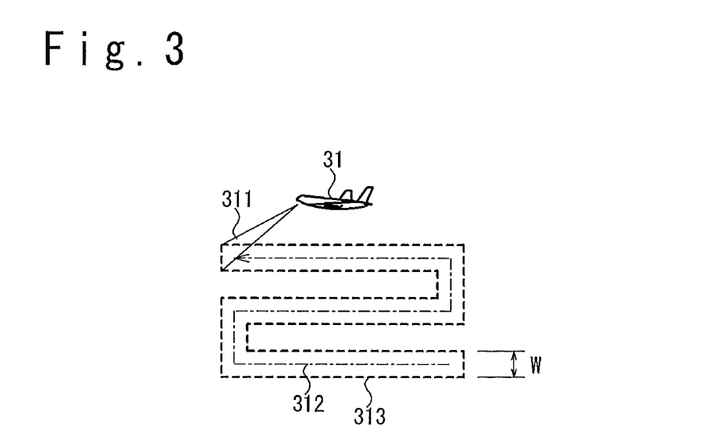
FIG. 3 is a diagram showing an example of definition of search ability.

FIG. 3 is a diagram showing an example of a definition of the search ability. In this case, the aircraft 31 will be described as the representative of the aircrafts 31 to 33 shown in FIG. 1, but this description is applied to the other aircrafts 32 and 33.

In the example of FIG. 3, a search area (region) 313 is searched by the aircraft 31 flying along a search route 312 while searching a search range 311 on the ocean. Supposing that the length of the search route 312 is L and the width of the search range 311 in a direction orthogonal to the search route 312 is W, the total search area 313 is calculated approximately as L×W.

There is a possibility that the actual length of the search route 312 varies depending on the model of each of the aircrafts 31 to 33, a kind and performance of search instruments loaded on the aircrafts 31 to 33, a weather situation from around the airports 21 and 22 to the search areas, the distances from the airports 21 and 22 to the search areas, and other various conditions. However, the search area 313 to be possibly searched in once flight can be calculated approximately.

Also, by going and returning through the search route 312, the search area 313 can be searched concentratedly.

The distribution of probabilities of discovering the search target can be calculated quantitatively by combining the above-mentioned conditions.

In the present invention, the quantitative estimation of the probability distribution to discover the target for every search vehicle is referred to as the "search ability" of the search vehicle. In the example shown in FIG. 3, it is easily expected that the discovery probability is higher in the inner portion of the search area 313, and the discovery probability is lower in the peripheral portion of the search area 313. Therefore, in the example shown in FIG. 3, the search ability is calculated to have a pattern similar to the probability distribution shown in FIG. 2.

Figure 4:
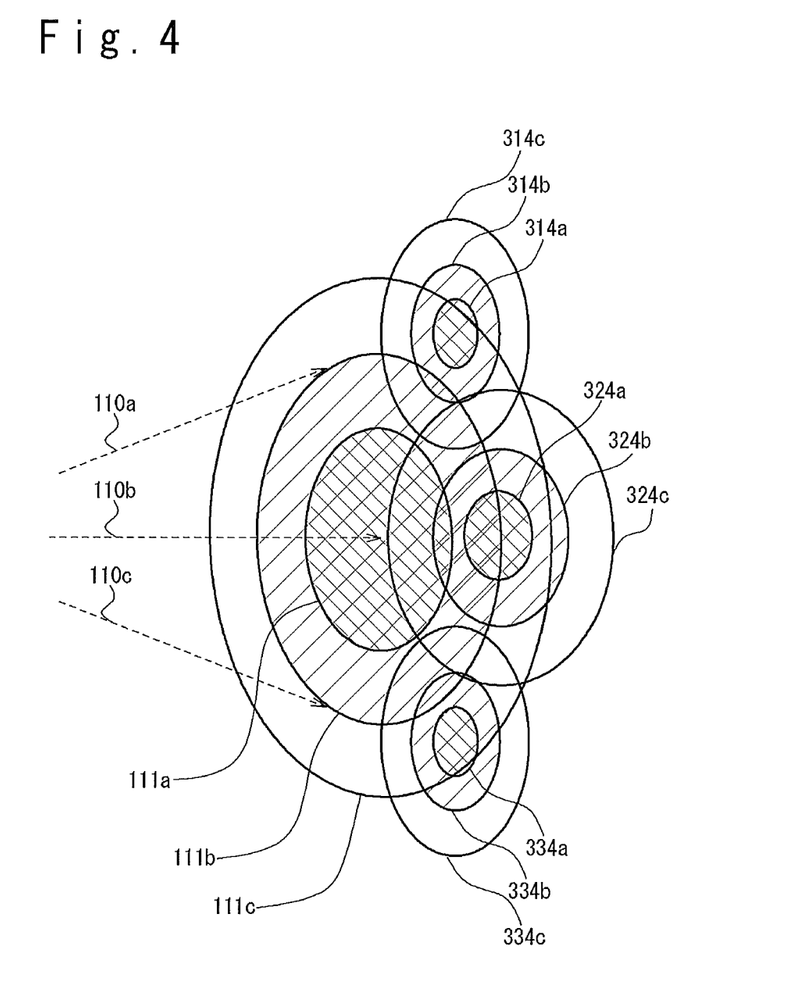
FIG. 4 is a diagram showing an example of definition of a necessary distribution amount of search vehicles.

FIG. 4 is a diagram showing an example of the definition of search vehicle deployment. In the example shown in FIG. 4, in order to maximize the probability of discovering the search target with some finite search vehicles, the contour lines 314a to 314c, 324a to 324c, and 334a to 334c showing distributions of the search target discovery probabilities are superimposed on the contour lines 111a to 111c showing the distribution of the search target existence probabilities in the example shown with FIG. 2.

Here, the contour lines 314a to 314c will be described. These contour lines 314a to 314c show the search ability of the aircraft 31 in charge of the first target movement route 110a. The probability of discovering the target when the aircraft 31 searches the target in an area shown by the contour line 314c is the highest in the inner contour line 314a, is next higher in the middle contour line 314b, and is next higher in the outer contour line 314c. Note that a probability that the target would exist outside the outer contour line 111c is not zero.

In the same way, the contour lines 324a to 324c show the search ability of the aircraft 32 in charge of the second target movement route 110b, and the contour lines 334a to 334c shows the search ability of the aircraft 33 in charge of the third target movement route 110c. Further detailed description of these contour lines 324a to 324c and 334a to 334c is the same as the above-mentioned description of the contour lines 314a to 314c. Accordingly, the description is omitted.

In the example of FIG. 4, for simplification of the description, the search ability is shown by a set of the contour lines. However, like the case of the probability distribution of the target, the ocean is divided into a plurality of meshes which have a square shape or a hexagonal shape, and the probability of discovering the target by the search vehicle may be calculated for every mesh.

A probability to search and discover a target by a search vehicle in an area where the target is predicted to exist in a predetermined time zone can be determined as a product of the target existence probability and the target discovery probability. The integration of such a product over the whole search area gives a discovery probability of the whole search activity. In the present invention, the search vehicles are deployed so that the discovery probability of the whole search activity is maximized, and the deployment of the search vehicles is called a "search effort distribution".

In the present invention, in order to operate the some limited search vehicles in the maximum efficiency, a search schedule is automatically determined such that the discover probability is maximized over the whole search activity. Conventionally, when the determination of the search schedule is automatically executed by a computer, an enormous amount of combinations needs to be calculated. In the present invention, the position of the target in a predetermined time zone and the search ability of each of the plurality of search vehicles are simplified as probability distributions. Moreover, an amount of calculation can be reduced greatly by using the search effort distribution calculated as middle data.

Figure 5A:
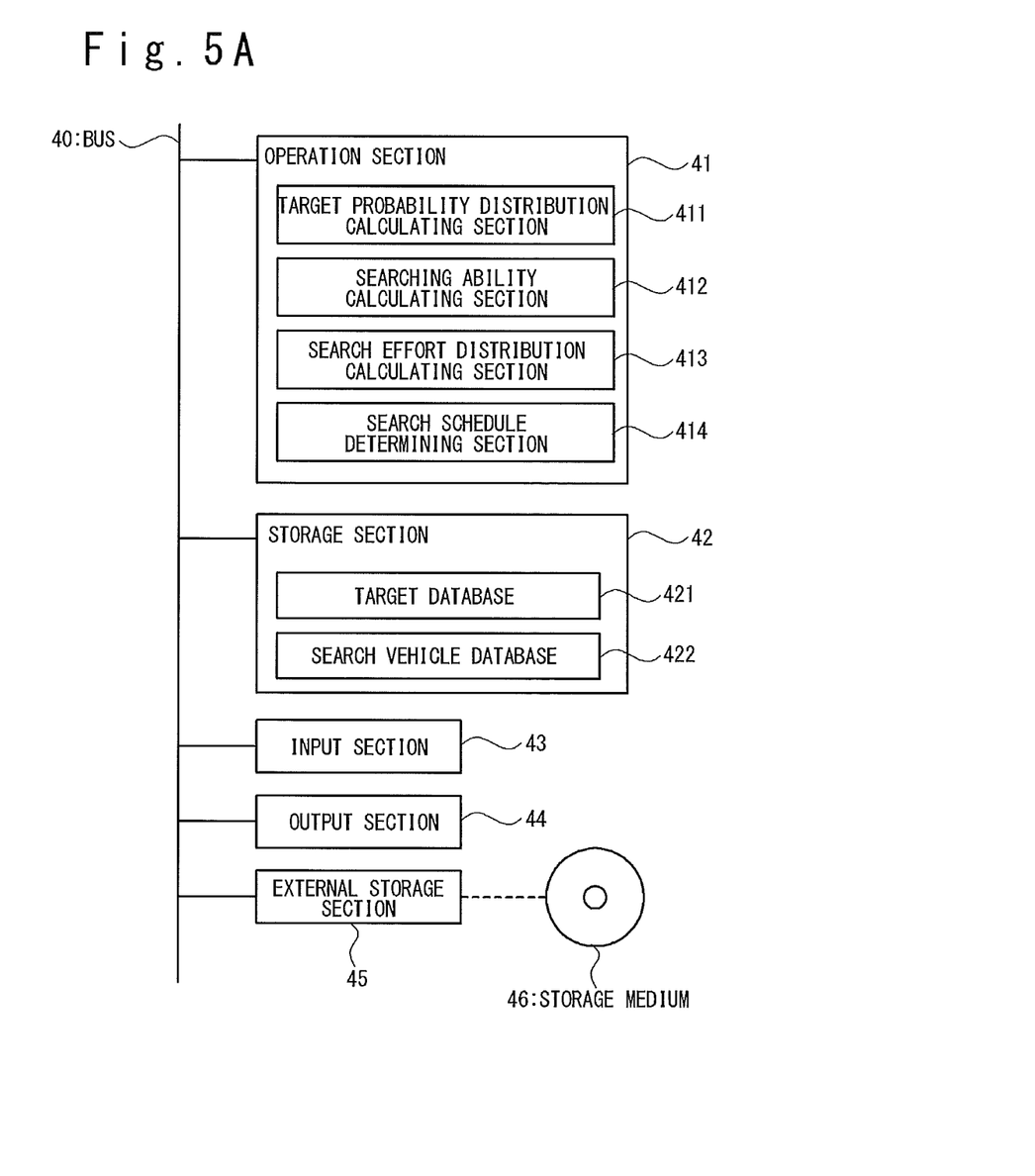
FIG. 5A is a block diagram showing a configuration example of a search schedule determining apparatus according to the present invention.

FIG. 5A is a block diagram showing a configuration example of the search schedule determining apparatus according to the first embodiment of the present invention. The components of the search schedule determining apparatus in the configuration example shown in FIG. 5A will be described.

The search schedule determining apparatus shown in FIG. 5A has a bus 40, an operation section 41, a storage section 42, an input section 43, an output section 44 and an external storage section 45. Note that the search schedule determining apparatus may have a storage medium 46. Also, a part or the whole of the components contained in the search schedule determining apparatus shown in FIG. 5A may be configured by using a general-purpose computer.

The operation section 41 contains a target distribution probability calculating section 411, a search ability calculating section 412, a search effort distribution calculating section 413 and a search schedule determining section 414. The storage section 42 contains a target database 421 and a search vehicle database 422.

The connection relation of the components shown in FIG. 5A will be described. The bus 40 is connected with the operation section 41, the storage section 42, the input section 43, the output section 44 and the external storage section 45. In other words, the operation section 41, the storage section 42, the input section 43, the output section 44 and the external storage section 45 are mutually connected through the bus 40.

The operation of each of the components shown in FIG. 5A will be described.

The bus 40 mediates various types of signals which are transmitted and received by the operation section 41, the storage section 42, the input section 43, the output section 44 and the external storage section 45.

The operation section 41 has a CPU and executes various programs stored in the storage section 42 to realize various functions corresponding to the various programs. In more detailed, the operation section 41 executes corresponding programs to function as the target distribution probability calculating section 411, the search ability calculating section 412, the search effort distribution calculating section 413 and the search schedule determining section 414. The operation section 41 may use a part of storage section 42 as a memory area for calculation when executing these programs. A set of these programs is a search schedule determining program in the present invention.

These programs are stored in the non-transitory storage medium 46, and it is read by the external storage section 45 and may be stored in the storage section 42.

Note that a part or the whole of the target distribution probability calculating section 411, the search ability calculating section 412, the search effort distribution calculating section 413 and the search schedule determining section 414 may be provided as operation circuits physically independent from the operation section 41 having general functions. In this case, it is desirable that the operation circuits provided independently are connected with the bus 40.

The target distribution probability calculating section 411 calculates a target distribution probability. In more detailed, the operation section 41 executes a predetermined program to function as the target distribution probability calculating section 411, to calculate a target distribution probability based on the target previous information stored in the target database 421, and to store the result in the target database 421.

The search ability calculating section 412 calculates the search ability. In more detailed, the operation section 41 executes a predetermined program to function as search ability calculating section 412, to calculate the search ability based on the search vehicle previous information stored in the search vehicle database 422 and to store the result in the search vehicle database 422.

The search effort distribution calculating section 413 calculates a search effort distribution. In more detailed, the operation section 41 executes a predetermined program to function as the search effort distribution calculating section 413, and to calculate search effort distribution based on the target distribution probability stored in the target database 421 and the search ability stored in the search vehicle database 422.

The search schedule determining section 414 automatically determines the search schedule. In more detailed, the operation section 41 executes a predetermined program to function as the search schedule determining section 414 based on the target previous information stored in the target database 421, the search vehicle previous information stored in the search vehicle database 422 and the search effort distribution calculated by the search effort distribution calculating section 413, to automatically determine the search schedule, and to output the result from the output section 44.

The storage section 42 stores the target database 421 and the search vehicle database 422 so that the operation section 41 is possible to read and write. Also, a part of the storage section 42 may function as the memory area for the calculation, as mentioned above.

It is desirable that the target database 421 and the search vehicle database 422 in the storage section 42 are configured of a non-volatile storage device. The storage section used as the memory area for the calculation may be non-volatile or volatile.

The target database 421 stores the target previous information. Also, after the target distribution probability calculating section 411 calculates a probability distribution of the target, the target database 421 stores the calculated target distribution probability.

The search vehicle database 422 stores the search vehicle previous information. Also, after the search effort distribution calculating section 413 calculates the search effort distribution, the search vehicle database 422 stores the calculated search effort distribution.

The input section 43 inputs various signals externally. Especially, the input section 43 inputs a start signal requesting the operation start of the search effort distribution calculating section 413 and the search schedule determining section 414 from outside, for example, through the operation of buttons (not shown).

Besides, the input section 43 may be used for the input of information to be stored in the target database 421 and the search vehicle database 422.

The output section 44 outputs various signals for the outside. For example, the output section 44 outputs the determined search schedule from a display section (not shown). Besides, the search schedule may be stored in the storage section 42 and may be preserved in a storage medium through the external storage section 45.

The external storage section 45 reads and writes various data from and to the storage medium 46. The external storage section 45 reads the various programs stored in the storage medium 46 and stores them in the storage section 42 through the bus 40.

The storage medium 46 stores various data and the various programs in readable and writable manner. The storage medium 46 stores the search schedule determining program of the present invention executed by the search schedule determining apparatus of the present invention, to realize the search schedule determining method of the present invention.

Figure 5B:
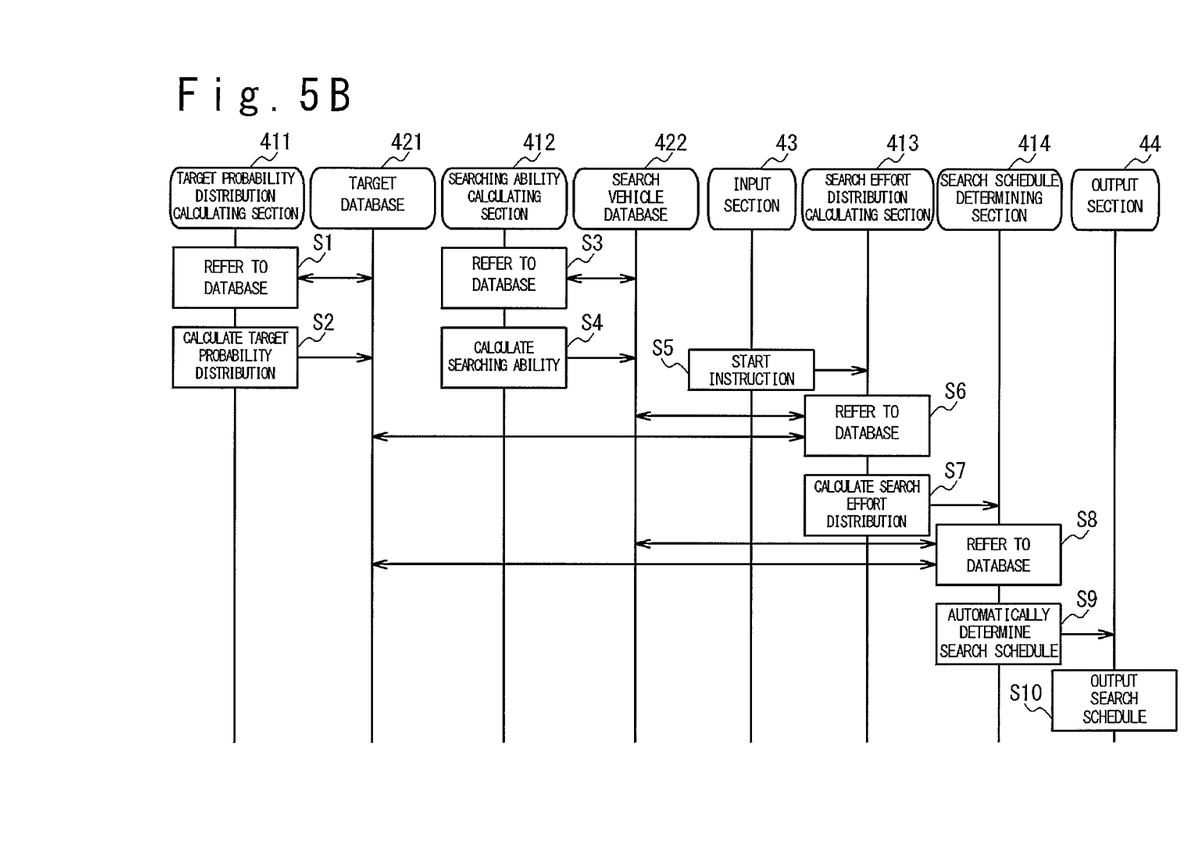
FIG. 5B is an example of a time chart showing each of steps executed in the search schedule determining method of the present invention.

FIG. 5B is an example of a time chart showing each of steps executed in the search schedule determining method in the present invention. The time chart shown in FIG. 5B contains a first step S1 to a tenth step S10.

At the first step S1, the target distribution probability calculating section 411 refers to the target database 421. More specifically, the target distribution probability calculating section 411 requests necessary information to the target database 421, and the target database 421 supplies the requested information to the target distribution probability calculating section 411. The information requested by the target distribution probability calculating section 411 contains target previous information about the ships as the search target. After the first step S1, a second step S2 is executed.

At the second step S2, the target distribution probability calculating section 411 calculates a target distribution probability and stores the result in the target database 421. More specifically, the target distribution probability calculating section 411 calculates the target distribution probability based on the target previous information read at the first step S1.

The first and second steps S1 and S2 are executable independently from the other steps. In other words, a routine of calculating the target distribution probability may be repeatedly executed at any time every time the target previous information is updated.

At a third step S3, the search ability calculating section 412 refers to the search vehicle database 422. More specifically, the search ability calculating section 412 requests necessary information to the search vehicle database 422, and the search vehicle database 422 supplies the requested information to the search ability calculating section 412. The information requested by the search ability calculating section 412 contains the search vehicle previous information about the aircrafts as the search vehicles. After the third step S3, a fourth step S4 is executed.

At the fourth step S4, the search ability calculating section 412 calculates the search ability and stores the result in the search vehicle database 422. More specifically, the search ability calculating section 412 calculates the search ability based on the search vehicle previous information read at the third step S3.

The third and fourth steps S3 and S4 are executable independently from the other steps. In other words, a routine of calculating the search ability is updated may be repeatedly executed at any time every time the search vehicle previous information.

At a fifth step S5, the input section 43 transmits a start instruction signal to the search effort distribution calculating section 413. After the fifth step S5, a sixth step S6 is executed.

At the sixth step S6, the search effort distribution calculating section 413 refers to the target database 421 and the search vehicle database 422. More specifically, the search effort distribution calculating section 413 requests necessary first information to the target database 421, and the target database 421 supplies the requested first information to the search effort distribution calculating section 413. The first information contains the target distribution probability calculated at the second step S2. Also, the search effort distribution calculating section 413 requests necessary second information to the search vehicle database 422, and the search vehicle database 422 supplies the requested second information to the search effort distribution calculating section 413. The second information contains the search ability calculated at the fourth step S4. After the sixth step S6, a seventh step S7 is executed.

At the seventh step S7, the search effort distribution calculating section 413 calculates the search effort distribution and supplies the result to the search schedule determining section 414. After the seventh step S7, an eighth step S8 is executed.

At the eighth step S8, the search schedule determining section 414 refers to the target database 421 and the search vehicle database 422. More specifically, the search effort distribution calculating section 413 requests the necessary first information to the target database 421, and the target database 421 supplies the requested first information to the search effort distribution calculating section 413. The first information contains the target previous information. Also, the search effort distribution calculating section 413 requests necessary second information to the search vehicle database 422, and the search vehicle database 422 supplies the requested second information to the search effort distribution calculating section 413. The second information contains the search vehicle previous information for every search vehicle. After the eighth step S8, a ninth step S9 is executed.

At the ninth step S9, the search schedule schedule determining section 414 automatically determines the search schedule and supplies the result to the output section 44. After the ninth step S9, a tenth step S10 is executed.

At the tenth step S10, the output section 44 outputs the search schedule determined at the ninth step S9. When the tenth step S10 completes, the search schedule determining method and the search schedule determining program of the present invention are ended. However, after the search schedule is determined and outputted, the first to fourth steps S1 to S4 may be repeatedly executed appropriately, as mentioned above.

Figure 6:
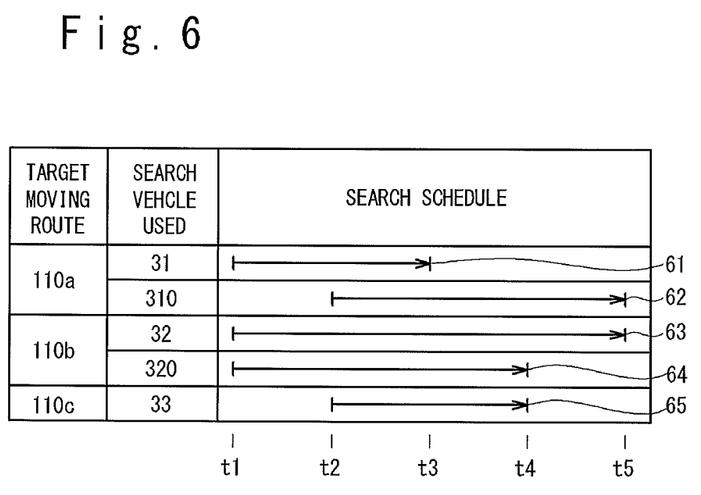
FIG. 6 is an example of the schedule obtained by the search schedule determining apparatus and the search schedule determining method in the present invention.

FIG. 6 is an example of the search schedule obtained by the search schedule determining apparatus and the search schedule determining method in the present invention. FIG. 6 shows a combination of the target movement routes 110a to 110c corresponding to the search areas and the search schedules showing the time zones until return to the airports after taking off from the airports, for each of the used search vehicles which are the five aircrafts 31, 310, 32, 320 and 33.

In the example shown in FIG. 6, the aircraft 31 takes off from the airport at time t1, carries out the search operation in the search area corresponding to the target movement route 110a, and then returns to the airport at time t3. The aircraft 310 takes off from the airport at time t2, carries out the search operation in the search area corresponding to the target movement route 110a, and then returns to the airport at time t5. The aircraft 32 takes off from the airport at the time t1, carries out the search operation in the search area corresponding to the target movement route 110b, and then returns to the airport at the time t5. The aircraft 320 takes off from the airport at the time t1, carries out the search operation in the search area corresponding to the target movement route 110b, and then returns to the airport at a time t4. The aircraft 33 takes off from the airport at the time t2, carries out the search operation in the search area corresponding to the target movement route 110c, and then returns to the airport at the time t4.

Note that a more specific flight route of each of the aircrafts 31, 310, 32, 320, and 33 as the search vehicles may be calculated as a part of a search schedule by the search schedule determining section 414 based on the target movement routes 110a to 110c to the search areas, the probability distribution of the ships 11 to 15 as the target at a time zone for the search operation to be carried out, and the positions of the airports 21 and 22 where each of the aircrafts stands-by.

The embodiments have been described in which the search schedule shown in FIG. 6 is automatically determined from the examples shown in FIG. 1 to FIG. 4 about the target and the search vehicles.

As above, the present invention has been described with reference to the embodiments. However, the present invention is not limited to the embodiments. The present invention may be changed or modified in a range which does not deviate from the spirit of the present invention. Also, the features of the embodiments described above can be freely combined in a range which does not cause any technical contradiction.

What is claimed is:

1. A search schedule determining apparatus comprising:
 a target probability distribution calculating section which calculates a target probability distribution showing a distribution of probabilities of positions where a target is predicted to exist in a predetermined time zone, based on target previous information collected previously for the target as a search object, wherein the target previous information contains a position of a ship at a predetermined reference time, a movement speed of the ship, possible movement routes of the ship, and a probability that each of the possible movement routes is adopted by the ship;
 a target database which stores the target previous information;
 a search ability calculating section which calculates a search ability showing a quantitative evaluation of an ability to discover the target based on search vehicle previous information collected previously for each of a plurality of search vehicles;
 a search vehicle database which stores the search vehicle previous information;
 a search effort distribution calculating section which calculates a search effort distribution based on the target probability distribution and the search ability such that a combination of probabilities in which each of the plurality of search vehicles discovers the target is maximum;
 a search calculating section which automatically determines a search schedule based on the target previous information and the search vehicle previous information; and
 an output section which outputs the determined search schedule such that the plurality of search vehicles is operated to realize the search effort distribution,
 wherein
 the target is ships which move on ocean,
 each of the plurality of search vehicles is an aircraft which searches the ships while flying in air,
 the search vehicle previous information contains:
  a stand-by position where each of the plurality of search vehicles stands-by on a land before and after the search; and
  a search possible time showing a maximum time from when a search vehicle of the plurality of search vehicles takes off from the stand-by position to when the search vehicle returns to the stand-by position, and
  wherein the search ability of the search vehicle contains distribution information of a search area to be searched by the search vehicle during the search possible time and a probability, wherein the search area is determined based on a length of the search route, and wherein the search area contains a kind and performance of a search instrument loaded on the aircraft, a weather situation from around an airport to the search area, and a length from an airport where the aircraft stands by to the search area, and
 the target previous information contains:
  a position of the target at a predetermined reference time;
  a route to be selected by the target and a probability that the route is selected; and
  a speed of the target when the target advances on the route.

2. A search schedule determining method comprising:
 collecting target previous information of a target as a search object by a target distribution probability calculating section, wherein the target previous information contains a position of a ship at a predetermined reference time, a movement speed of the ship, possible movement routes of the ship, and a probability that each of the possible movement routes is adopted by the ship;
 storing the target previous information in a target database;
 calculating a target probability distribution showing a distribution of probabilities of positions where the target is predicted to exist in a predetermined time zone, based on the target previous information by the target distribution probability calculating section;
 collecting search vehicle previous information of each of a plurality of search vehicles by a search ability calculating section;
 storing the search vehicle previous information in a search vehicle database;
 calculating search ability showing a quantitative evaluation of ability to discover the target based on the search vehicle previous information by a search ability calculating section;
 calculating a search effort distribution based on the target probability distribution and the search ability by a search effort distribution calculating section, such that a combination of the probabilities in which each of the plurality of search vehicles discovers the target is maximum;
 automatically determining a search schedule based on the target previous information and the search vehicle previous information by a search schedule calculating section; and
 outputting the search schedule determined in the determining such that the plurality of search vehicles is operated to realize the search effort distribution,
 wherein
 the target is ships which move on ocean,
 each of the plurality of search vehicles is an aircraft which searches the ships while flying in air,
 the search vehicle previous information contains:
  a stand-by position where each of the plurality of search vehicles stands-by on a land before and after the search; and
  a search possible time showing a maximum time from when a search vehicle of the plurality of search vehicles takes off from the stand-by position to when the search vehicle returns to the stand-by position, and
  wherein the search ability of the search vehicle contains distribution information of a search area to be searched by the search vehicle during the search possible time and a probability, wherein the search area is determined based on a length of the search route, and wherein the search area contains a kind and performance of a search instrument loaded on the aircraft, a weather situation from around an airport to the search area, and a length from an airport where the aircraft stands by to the search area, and
 the target previous information contains:
  a position of the target at a predetermined reference time;

a route to be selected by the target and a probability that the route is selected; and a speed of the target when the target advances on the route.

3. A non-transitory recording medium which stores a search schedule determining program to make a computer execute the search schedule determining program to implement functions comprising:

collecting target previous information of a target as a search object by a target distribution probability calculating section, wherein the target previous information contains a position of a ship at a predetermined reference time, a movement speed of the ship, possible movement routes of the ship, and a probability that each of the possible movement routes is adopted by the ship;

storing the target previous information in a target database;

calculating a target probability distribution showing a distribution of probabilities of positions where the target is predicted to exist in a predetermined time zone, based on the target previous information by the target distribution probability calculating section;

collecting search vehicle previous information of each of a plurality of search vehicles by a search ability calculating section;

storing the search vehicle previous information in a search vehicle database;

calculating search ability showing a quantitative evaluation of ability to discover the target based on the search vehicle previous information by a search ability calculating section;

calculating a search effort distribution based on the target distribution probability and the search ability by a search effort distribution calculating section, such that a combination of the probabilities in which each of the plurality of search vehicles discovers the target is maximum;

automatically determining a search schedule based on the target previous information and the search vehicle previous information by a search schedule calculating section; and outputting the search schedule determined in the determining such that the plurality of search vehicles is operated to realize the search effort distribution, wherein the target is ships which move on ocean, each of the plurality of search vehicles is an aircraft which searches the ships while flying in air, the search vehicle previous information contains:
  a stand-by position where each of the plurality of search vehicles stands-by on a land before and after the search; and
  a search possible time showing a maximum time from when a search vehicle of the plurality of search vehicles takes off from the stand-by position to when the search vehicle returns to the stand-by position, and wherein the search ability of the search vehicle contains distribution information of a search area to be searched by the search vehicle during the search possible time and a probability, wherein the search area is determined based on a length of the search route, and wherein the search area contains a kind and performance of a search instrument loaded on the aircraft, a weather situation from around an airport to the search area, and a length from an airport where the aircraft stands by to the search area, and the target previous information contains:
  a position of the target at a predetermined reference time;
  a route to be selected by the target and a probability that the route is selected; and
  a speed of the target when the target advances on the route.

* * * * *